United States Patent [19]

Sato et al.

[11] Patent Number: 4,480,478
[45] Date of Patent: Nov. 6, 1984

[54] PRESSURE SENSOR EMPLOYING SEMICONDUCTOR STRAIN GAUGE

[75] Inventors: Hideo Sato, Hitachi; Motohisa Nishihara, Katsuta; Kazuji Yamada, Hitachi; Seikou Suzuki, Hitachiohta, all of Japan

[73] Assignee: Hitachi, Ltd., Tokyo, Japan

[21] Appl. No.: 466,027

[22] Filed: Feb. 14, 1983

[30] Foreign Application Priority Data

Feb. 17, 1982 [JP] Japan ............................ 57-22633

[51] Int. Cl.³ .............................................. G01L 9/06
[52] U.S. Cl. ...................................... 73/708; 73/721; 73/727
[58] Field of Search .............. 73/708, 720, 721, 726, 73/727; 338/4; 324/DIG. 1; 323/366, 365

[56] References Cited

U.S. PATENT DOCUMENTS

| | | | |
|---|---|---|---|
| 2,898,544 | 8/1959 | Flight et al. | 323/366 |
| 3,207,984 | 9/1965 | Tolliver | 323/366 |
| 3,808,469 | 4/1974 | Raymond et al. | 323/365 |
| 4,233,848 | 11/1980 | Sato et al. | 324/DIG. 1 |
| 4,337,665 | 7/1982 | Sato et al. | 73/708 |

Primary Examiner—Donald O. Woodiel
Attorney, Agent, or Firm—Antonelli, Terry & Wands

[57] ABSTRACT

Four semiconductor strain gauges constitute a bridge circuit. This bridge circuit and a sensitivity temperature compensation circuit are connected in series, and a constant voltage is applied to the series circuit. The sensitivity temperature compensation circuit varies a voltage across the bridge circuit, depending upon temperatures. The constant voltage is divided to produce a predetermined voltage. The predetermined voltage is selected to be equal to the voltage of one output side node of the bridge circuit at the time when the semiconductor strain gauges are unstrained and at a predetermined temperature. The point of this voltage and the output side node are connected through a resistor so as to perform zero-point temperature compensation.

8 Claims, 2 Drawing Figures

PRESSURE SENSOR EMPLOYING SEMICONDUCTOR STRAIN GAUGE

BACKGROUND OF THE INVENTION

The present invention relates to a pressure sensor employing a semiconductor strain gauge, and more particularly to a pressure sensor including zero-point temperature compensation means.

Various gauges have been used for measuring masses, stresses, fluid pressures, etc. Among all, semiconductor strain gauges of high sensitivites utilizing the piezoresistance effects of semiconductors have been extensively applied in recent years.

The semiconductor strain gauge exploiting the piezoelectric effect of a semiconductor has the advantage that the rate of variation of a resistance to a strain, namely, the gauge factor is high. On the other hand, however, the gauge has the disadvantage that the resistance and the gauge factor thereof exhibit temperature dependencies of great magnitudes, resulting in unstable operations.

In general, the resistance R of a semiconductor strain gauge is given by the following equation:

$$R = R_0(1+\alpha T)\{1 + S\gamma(1+\beta T)\} \quad (1)$$

where $R_0$ denotes the resistance of the unstrained gauge at a predetermined temperature, T the temperature of the semiconductor strain gauge, S the magnitude of a strain, $\alpha$ the temperature coefficient of the resistance of the gauge, $\beta$ the temperature coefficient of the gauge factor of the gauge, and $\gamma$ the gauge factor. The gauge factor $\gamma$ has its value and its sign determined depending upon the orientation of a semiconductor single crystal, an angle defined between a current and a stress within the gauge, etc.

Equation (1) is expanded as follows:

$$R = R_0(1+\alpha T) + R_0(1+\alpha T)(1+\beta T)S\gamma \quad (2)$$

$$\approx R_0(1+\alpha T) + R_0\{1+(\alpha+\beta)T\}S\gamma \quad (3)$$

The second term of the right-hand side of Equation (2) indicates the variation of the gauge resistance based on the strain. The coefficient $\alpha$ varies depending upon an impurity density within the crystal of the semiconductor strain gauge and has, for example, a value of 3000–600 ppm/°C. in case of the single crystal of silicon, while the coefficient $\beta$ does not depend upon the impurity density and has a value of about $-2000$ ppm/°C. in the case of the silicon single crystal. The variation of the gauge resistance can have its temperature dependency diminished because, as apparent from the second term of Equation (3), the temperature coefficient $\alpha$ of the resistance of the semiconductor strain gauge and the temperature coefficient $\beta$ of the gauge factor thereof can be canceled by properly selecting the impurity density of the crystal.

A plurality of semiconductor strain gauges as described above constitute a strain-electric signal conversion bridge. The output of the bridge at the time of null (0) strain varies with a temperature change, or exhibits the so-called temperature dependency, on account of dispersions in the resistances $R_0$ of the gauges and the temperature coefficients $\alpha$ thereof. This temperature dependency is the "zero-point temperature dependency", and it is the "zero-point temperature compensation" that reduces and compensates such temperature dependency.

As an expedient for the zero-point temperature compensation, the inventors have proposed a system disclosed in the specification of Japanese Patent Application No. 54-20847 (1979). This application was laid open as Japanese Patent Application Laying-open No. 55-113904 on Sept. 2, 1980. The corresponding U.S. application was filed as Ser. No. 121,093 on Feb. 13, 1980, and has been allowed as U.S. Pat. No. 4,337,665 under the date of July 6, 1982. The corresponding West-German application was filed as Application No. 3007142. 2-52 on Feb. 26, 1980, and is now pending.

With this system, however, a complicated circuit arrangement is involved. Accordingly, the system is problematic in point of reliability. More specifically, a circuit shown in FIG. 2 of U.S. Pat. No. 4,337,665 includes four amplifiers. Further, it includes fifteen resistors. A pressure sensor obtained by actually fabricating the circuit of FIG. 2 has included two transistors, twenty-five resistors, two thermistors and four capacitors, in addition to the four amplifiers.

Besides, the zero-point temperature compensation is performed by the use of an active circuit. More specifically, voltages at the middle points a and b of the two arms of semiconductor strain gauges are applied to the plus inputs of differential amplifiers 19 and 20, the minus inputs of which is supplied with a current for the zero-point temperature compensation. The zero-point temperature compensation is performed using the differential amplifiers 19 and 20, that is, using active elements. Also an amplifier 6 is used for effecting the temperature compensation with a constant current drive system.

SUMMARY OF THE INVENTION

An object of the present invention is to provide a pressure sensor which has a high reliability owing to a simple circuit arrangement for the zero-point temperature compensation.

Another object of the present invention is to provide a pressure sensor which can perform the zero-point temperature compensation by the use of a passive circuit.

The present invention consists in that a constant voltage is applied to a series circuit which consists of a sensitivity temperature compensation circuit and a bridge circuit including at least one semiconductor strain gauge, and that a zero-point temperature compensation circuit is connected to the middle point of one arm of the bridge circuit.

DESCRIPTION OF THE PREFERRED EMBODIMENT

Figure 1:
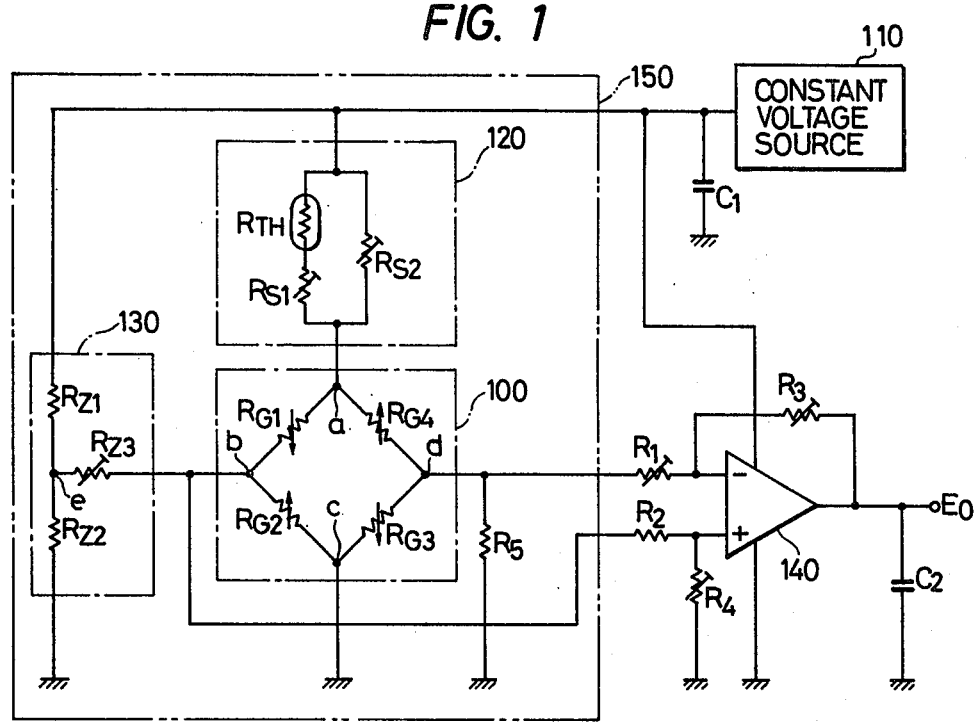
FIG. 1 is a circuit diagram of an embodiment of the present invention.

An embodiment of the present invention will be described with reference to FIG. 1.

Reference numeral 100 designates a bridge circuit for detecting a pressure. The unbalance output of the bridge circuit 100 is amplified by an amplifier 140 into an output $E_0$. A sensitivity temperature compensation circuit 120 is connected in series with the bridge circuit 100. This sensitivity temperature compensation circuit 120 is used for compensating the change of the sensitivity of the pressure sensor dependent upon temperatures. The series circuit consisting of the bridge circuit 100 and the sensitivity temperature compensation circuit 120 is connected to a constant voltage source 110. In addition, a zero-point temperature compensation circuit 130 is connected to the bridge circuit 100 so as to compensate the change of the zero point of the pressure sensor dependent upon temperatures.

Now, the detailed arrangements and operations of these circuits will be described. The bridge circuit 100 is composed of four semiconductor strain gauges $R_{G1}$, $R_{G2}$, $R_{G3}$ and $R_{G4}$. A series circuit consisting of the strain gauges $R_{G1}$ and $R_{G2}$ forms one arm of the bridge, while a series circuit consisting of the strain gauges $R_{G3}$ and $R_{G4}$ forms the other arm of the bridge. The two arms are connected at points a and c respectively, and points b and d are the middle points of the respective arms. These semiconductor strain gauges are formed by diffusing P-type layers on a semiconductor diaphragm of N-type silicon or the like. When a pressure is applied to the semiconductor diaphragm, the diaphragm bends to give rise to a strain therein. This strain can be detected in the form of the resistance changes of the semiconductor strain gauges. Two of the four strain gauges undergo compressive strains, and the other two undergo tensile strains. Accordingly, the resistances of the strain gauges $R_{G1}$ and $R_{G3}$ decrease with increases in the strains. In contrast, the resistances of the strain gauges $R_{G2}$ and $R_{G4}$ increase with increases in the strains. The variations of the gauge resistances based on the strains have negative temperature characteristics. The sensitivity varies due to the characteristics. In order to perform the temperature compensation of the sensitivity, a voltage to be applied to the bridge circuit 100 is endowed with a positive temperature characteristic. More specifically, the constant voltage source 110 is employed as a power source. The sensitivity temperature compensation circuit 120 is connected between the constant voltage source 110 and the bridge circuit 100. Owing to the sensitivity temperature compensation circuit 120, a voltage at the point a of the bridge circuit 100 increases with a temperature rise. The compensation circuit 120 is composed of a thermistor $R_{TH}$ and resistors $R_{S1}$ and $R_{S2}$. The thermistor $R_{TH}$ is a thick film thermistor. The resistors $R_{S1}$ and $R_{S2}$ are thick film resistors.

The temperature coefficient of the sensitivity of the bridge circuit 100 is approximately $-2000$ ppm/°C. though it is somewhat different depending upon an impurity density at the time when the semiconductor strain gauges have been diffused and formed. The impedance of the sensitivity temperature compensation circuit 120 for compensating the temperature coefficient decreases at a higher temperature and increases at a lower temperature, owing to the effect of the thermistor $R_{TH}$. By setting the fixed resistors $R_{S1}$ and $R_{S2}$ at proper values, accordingly, a voltage $V_A$ across the points a and c of the bridge circuit 100 can be made a temperature coefficient of $+2000$ ppm/°C., so that the temperature compensation of the sensitivity can be realized.

The values of the thermistor $R_{TH}$ and the resistors $R_{S1}$ and $R_{S2}$ are selected as follows. On the basis of a mathematical expression representative of the output voltage $E_o$ of the pressure sensor, output voltages $E_o(0)$ and $E_o(80)$ under respective pressures of 0 kPa and 80 kPa are calculated at N temperature points. Using the method of least squares, the B constant and resistance of the thermistor $R_{TH}$ and the resistances of the resistors $R_{S1}$ and $R_{S2}$ are determined so that the sum of the squares of the rates of variation of $E_o(80) - E_o(0)$, namely, errors may become the least. The voltage of the constant voltage source 110 is 5.1 V, and a voltage drop of about 2.7 V develops across the compensation circuit 120, so that a voltage of about 2.4 V is applied to the bridge circuit 100.

Let it now be supposed that, when the semiconductor strain gauges are in their unstrained states and the ambient temperature has changed from a value $t_1$ to a value $t_2$, the resistances of the strain gauges $R_{G1}$, $R_{G2}$, $R_{G3}$ and $R_{G4}$ change from a value $R_{G1}(t_1)$ to a value $R_{G1}(t_2)$, from $R_{G2}(t_1)$ to $R_{G2}(t_2)$, from $R_{G3}(t_1)$ to $R_{G3}(t_2)$, and from $R_{G4}(t_1)$ to $R_{G4}(t_2)$, respectively. Then, these changes appear substantially rectilinearly. However, characteristic lines g which represent the relationships between the ambient temperature T and the resistances R of the respective semiconductor strain gauges are different.

Naturally the respective characteristic lines need to agree into a single characteristic line in order that the output voltage $V_o$ in the unstrained states of the semiconductor strain gauges may not be affected by the ambient temperature. However, this is difficult as already described, and the four different characteristic lines are demonstrated actually. With the zero-point temperature compensation of the prior art, it has been attempted to apparently bring the respective characteristic lines into agreement by connecting fixed resistors in series and parallel with the semiconductor strain gauges. The inventors, however, took note of the fact that the voltage $V_A$ across the points a and c of the bridge circuit becomes the temperature coefficient of $+2000$ ppm/°C. without the necessity of bringing the respective characteristic lines into agreement. They have attempted to compensate the zero-point temperature variation by connecting the output point b or d of the bridge circuit and a predetermined voltage point through a resistor.

To this end, the zero-point temperature compensation circuit 130 is constructed of resistors $R_{Z1}$, $R_{Z2}$ and $R_{Z3}$. These resistors $R_{Z1}$–$R_{Z3}$ are thick film resistors. The input supply voltage is divided by the resistors $R_{Z1}$ and $R_{Z2}$ so as to obtain a reference voltage at a point e. This point e and one output point b of the bridge circuit are connected through the resistor $R_{Z3}$.

Here, it is assumed that, when the ambient temperature has changed from $t_1$ to $t_2$ in the state ($V_Z = \infty$) in which the zero-point temperature compensation is not effected, the voltage across the points a and c of the bridge circuit increases from a value $V_{A1}$ to a value $V_{A2}$, while the output voltage changes from a value $V_{O1}$ to a value $V_{O2}$. Then, these changes appear substantially rectilinearly. The relationship between the ambient temperature T and the output voltage $V_o$ is indicated by a characteristic line $f_1$ in FIG. 2.

Next, the resistor $R_{Z1}$ or $R_{Z2}$ is adjusted so that the voltage across the points e and b may become null at the temperature $t_1$. That is, since the voltage of the point a is about 2.4 V and that of the point b is about 1.2 V as described before, the resistance is so adjusted that the voltage of the point e also becomes about 1.2 V. In this manner, the ratio of the voltage division by the resistors $R_{Z1}$ and $R_{Z2}$ is properly selected. Thus, at the temperature $t_1$, the output voltage remains at the value $V_{O1}$ even when the resistance of the resistor $R_{Z3}$ is varied. At the temperature $t_2$, the voltage of the point a increases to the value $V_{A2}$, and hence, the voltage of the point b becomes higher than that of the point e, so that the output voltage is increased above the value $V_{02}$ by the resistor $R_{Z3}$. The amount of this increase is inversely proportional to the resistance of the resistor $R_{Z3}$ approximately. Accordingly, the resistance of the resistor $R_{Z3}$ is adjusted so that the output voltage $V_0$ may become the value $V_{01}$ at the temperature $t_2$, whereby a current to leak to the side of the resistor $R_{Z2}$ through the resistor $R_{Z3}$ is adjusted. Thus, the change of the zero point can be compensated as indicated by a characteristic line $f_2$ in FIG. 2.

The compensation resistance $R_{Z3}$ can also be found with the following equation:

$$R_{Z3} = \frac{R_{12} \cdot R_{22}}{R_{12} + R_{22}} \left( \frac{\frac{R_{21}}{R_{11} + R_{21}} V_{A1} - \frac{R_{22}}{R_{12} + R_{22}} V_{A2}}{V_{02} - V_{01}} - 1 \right) \quad (4)$$

Figure 2:
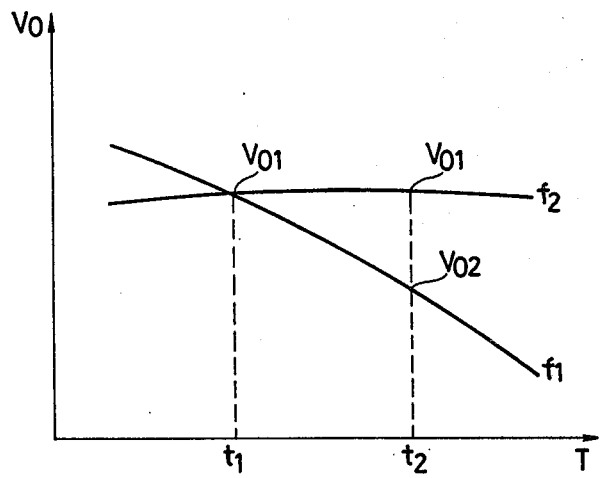
FIG. 2 is a diagram for explaining the principle of the embodiment of the present invention.

As understood from Equation (4) and FIG. 2, when $(V_{02}-V_{01})$ is plus, the resistor $R_{Z3}$ has a minus value, which is unrealizable. In this case, the compensation can be performed by connecting the resistor $R_{Z3}$ between the point e and the point d.

The point b of the bridge circuit 100 is connected to the plus input of the differential amplifier 140 through a resistor $R_2$. The point d of the bridge circuit 100 is connected to the minus input of the differential amplifier 140 through a resistor $R_1$. A resistor $R_4$ has its one end connected to the plus input of the differential amplifier 140, and has its other end grounded. A feedback resistor $R_3$ is connected across the output and minus input of the differential amplifier 140. The resistors $R_1$, $R_2$, $R_3$ and $R_4$ are thick film resistors. The differential amplifier 140 amplifies the unbalance output of the bridge circuit 100, and also performs a zero span adjustment by the use of the surrounding resistors $R_1$, $R_3$ and $R_4$. The zero span adjustment is carried out as stated below. First, under the pressure of 0 kPa, the resistor $R_2$ is trimmed so that the output may become a predetermined value $E_0$ (0). Secondly, the span is adjusted with the resistor $R_3$. Herein, when the resistance of the resistor $R_3$ is changed, also the zero point changes. Accordingly, letting $E_0$ (80) denote the output under the pressure of 80 kPa and $\Delta E_0$ (0) denote the variation of the zero point based on the change of the resistance of the resistor $R_3$, the resistor $R_3$ is trimmed so that the output may become ($E_0$ (80)+$\Delta E_0$ (0)) under the pressure of 80 kPa. Subsequently, the resistor $R_4$ is trimmed under the pressure of 0 kPa so that the output may become $E_0$ (0). Further, a resistor $R_5$ is connected in parallel with the strain gauge $R_{G3}$. Since the resistor $R_5$ is a thick film resistor, the rate of variation of the resistance thereof due to a temperature change is smaller than in the diffusion resistance of the strain gauge $R_{G3}$. Accordingly, the rate of variation of the resistance of a parallel circuit, consisting of the strain gauge $R_{G3}$ and the resistor $R_5$, due to a temperature change can be made smaller than the rates of variation of the resistances of the other strain gauges $R_{G1}$, $R_{G2}$ and $R_{G4}$. Consequently, even when the temperature-resistance characteristics of the respective semiconductor strain gauges are unbalanced, all the zero-point temperature characteristics thereof before the compensations can be made minus temperature coefficients. Accordingly, the temperature compensations can be made unidirectional.

The zero point can therefore be temperature-compensated by connecting the zero-point temperature compensation circuit 130 to the point b of the bridge circuit 100 at all times.

Capacitors $C_1$ and $C_2$ are inserted in order to cut off noise.

Here, the adjustment of the temperature compensation can be effected with only a sensor module 150. In the prior-art pressure sensor, it has been impossible to separate a sensor module and an amplifier module. According to the embodiment of the present invention, therefore, the productivity is enhanced.

As stated before, the prior-art pressure sensor has required the amplifier 6 because the sensitivity temperature compensation is effected by the constant current drive system. In contrast, in the embodiment of the present invention, the use of the constant voltage drive system allows to employ the sensitivity temperature compensation circuit 120 as shown in FIG. 1, so that one amplifier is dispensed with.

The zero-point temperature compensation is also different from that of the prior-art pressure sensor, so that amplifiers 18 and 22 in the prior art are dispensed with.

Thus, the number of components in the embodiment of the present invention totals fourteen consisting of one amplifier, ten resistors, one thermistor and two capacitors. The embodiment can accordingly reduce the number of components much and simplify the circuit arrangement. As compared with the prior art, it can reduce three amplifiers, two transistors, fifteen resistors, one thermistor and two capacitors.

In addition, since the sensor module is a temperature-compensated sensor, it can be directly connected to the controller, and hence, the sensor portion can be made small in size.

Moreover, since the sensor module includes no active element, the dynamic range of the supply voltage can be set wide. Besides, the minimum operating voltage can be lowered. This is based on the fact that the sensor module operates only when the input and output terminals of the amplifier being the active element lie in a range of voltages between a voltage which is about 1 V higher than the ground potential and a voltage which is about 1 V lower than the supply voltage, and also the fact that the influence of the offset voltage of the amplifier increases relatively when the supply voltage is lowered.

According to the present invention, a circuit arrangement for the zero-point temperature compensation in a pressure sensor can be simplified, and the pressure sensor can have the reliability enhanced and the cost reduced.

We claim:

1. A pressure sensor comprising:
    a bridge circuit which has two arms connected at both their ends, and which includes at least one semiconductor strain gauge between two middle points thereof and one end of the arm,
    a sensitivity temperature compensation circuit which is connected in series with said bridge circuit, and which varies an applied voltage of said bridge circuit in dependence on a temperature so as to compensate a sensitivity temperature characteristic of said bridge, means for applying a constant voltage to a series circuit consisting of said bridge circuit and said sensitivity temperature compensation circuit, amplification means for differentially amplifying voltages at said middle points of said two arms of said bridge circuit, and a zero-point temperature compensation circuit by which a point of a voltage equal to a potential of the middle point of one arm of said bridge circuit at the time when said semiconductor strain gauge is unstrained and is at a predetermined temperature is connected to said middle point of said one arm of said bridge circuit through a resistor.

2. A pressure sensor according to claim 1, wherein said sensitivity temperature compensation circuit is constructed of a series circuit consisting of a thermistor and a resistor, and a resistor connected in parallel with said series circuit.

3. A pressure sensor according to claim 2, wherein said thermistor and said resistors are thick film elements.

4. A pressure sensor according to claim 1, wherein the voltage point of said zero-point temperature compensation circuit is a node of two resistors which constitute a series circuit connected to the constant voltage application means.

5. A pressure sensor according to claim 4, wherein said resistors are thick film resistors.

6. A pressure sensor according to claim 1, wherein said bridge circuit includes four semiconductor strain gauges, two of which in diagonally facing relationship undergo compressive strains and the other two of which undergo tensile strains.

7. A pressure sensor according to claim 6, wherein a resistor is further connected in parallel with one semiconductor strain gauge in that arm of said bridge circuit to which said zero-point temperature compensation circuit, and the middle point of said arm to which this resistor is connected is connected to a minus input of said amplification means.

8. A pressure sensor according to claim 1, wherein that middle point of said one arm of said bridge circuit to which said zero-point temperature compensation circuit is that one of said two middle points at which the potential in the unstrained state and at the predetermined temperature is higher, when said semiconductor strain gauge has a positive zero-point temperature characteristic, and it is the other middle point at which the potential is lower, when said semiconductor strain gauge has a negative characteristic.

* * * * *